United States Patent
Iwashima

(10) Patent No.: US 8,781,339 B2
(45) Date of Patent: Jul. 15, 2014

(54) ELECTRONIC APPARATUS, NON-TEMPORARY RECORDING MEDIUM, COMMUNICATION TERMINAL UNIT, AND OPERATION CONTROL SYSTEM

(71) Applicant: KYOCERA Document Solutions Inc., Osaka (JP)

(72) Inventor: Yasuhiro Iwashima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 66 days.

(21) Appl. No.: 13/671,488

(22) Filed: Nov. 7, 2012

(65) Prior Publication Data
US 2013/0120781 A1 May 16, 2013

(30) Foreign Application Priority Data

Nov. 10, 2011 (JP) ................................. 2011-246969

(51) Int. Cl.
*G03G 15/00* (2006.01)
(52) U.S. Cl.
CPC ........ *G03G 15/5079* (2013.01); *G03G 15/5091* (2013.01)
USPC .................................................. 399/8; 399/11
(58) Field of Classification Search
CPC .......... G03G 15/5075; G03G 15/5079; G03G 15/5091
USPC ................................................. 399/8, 11, 80
See application file for complete search history.

(56) References Cited

U.S. PATENT DOCUMENTS

| 5,369,471 | A | * | 11/1994 | Yamada | 399/8 |
| 2010/0290084 | A1 | * | 11/2010 | Russell et al. | 358/1.15 |
| 2011/0026080 | A1 | * | 2/2011 | Onishi | 358/1.15 |

FOREIGN PATENT DOCUMENTS

JP 2004343550 A * 12/2004

* cited by examiner

*Primary Examiner* — David Gray
*Assistant Examiner* — Gregory H Curran
(74) *Attorney, Agent, or Firm* — Knobbe Martens Olson & Bear LLP

(57) ABSTRACT

A multifunction peripheral 1 includes a communication portion 102, a control portion 101, a certified reference time storage portion 103, and a determining portion 104. A communication portion 102 receives a total maintenance time stored in a communication terminal unit 31 from the communication terminal unit 31. A control portion 101 switches its operation mode between a maintenance mode and a normal operation mode to activate the multifunction peripheral 1. A certified reference time storage portion 103 stores a certified reference time that permits switching to the maintenance mode. A determining portion 104 determines whether the total maintenance time has reached the certified reference time. When it is determined that the total maintenance time has reached the certified reference time by the determining portion 104, the control portion 101 switches the multifunction peripheral 1 to the maintenance mode to activate the multifunction peripheral 1.

8 Claims, 8 Drawing Sheets

ELECTRONIC APPARATUS, NON-TEMPORARY RECORDING MEDIUM, COMMUNICATION TERMINAL UNIT, AND OPERATION CONTROL SYSTEM

REFERENCE TO RELATED APPLICATIONS

This application is based upon and claims the benefit of priority from the corresponding Japanese Patent Application No. 2011-246969, filed in the Japan Patent Office on Nov. 10, 2011, the entire contents of which are incorporated herein by reference.

BACKGROUND

The present disclosure relates to an electronic apparatus, a non-temporary recording medium, a communication terminal unit, and an operation control system, more particularly to an operation control in a maintenance mode which enables an operator to change an operation setting of the electronic apparatus.

Conventionally, an electronic apparatus such as an image forming apparatus can be operated in a maintenance mode which allows an operator in charge of maintenance or the like to change an operation setting of the image forming apparatus to perform voltage adjustment for each of operations for development, charging, exposure and image transfer and display adjustment of a display portion in the image forming apparatus. A security system has been known to permit only the operator in charge of maintenance to perform maintenance work, the security system authenticating the operator or requesting the operator to execute a login procedure. For example, an image processing apparatus (hereinafter referred to as related art 1) has been known which after having the operator execute a process which differs depending on name, sex, age, experience years, skill level about whether the operator is a beginner or an highly skilled operator, section which the operator belongs to or password, allows the operator to execute image processing.

However, if the above-mentioned user authentication is executed to determine whether the operation in the maintenance mode is permitted, a server for executing the user authentication is necessary. Furthermore, if the login procedure is required, it is necessary to register information of the operator about to be permitted to log in (e.g., operator's identification (ID)) into the image forming apparatus, thus its registration work and storage area are necessary. When having the operator to execute a process which differs depending on each operator using the image forming apparatus of the above-described related art 1, it is necessary to input information about the operator such as an operator's name into the image forming apparatus for each process which the operator intends to execute. In the above-described control operation using information such as operator's ID or name, it is likely that the information about the ID or name may leak to other people, so that it is feared that the electronic apparatus may be switched to the maintenance mode by other people to change its operation setting.

SUMMARY

An electronic apparatus of the present disclosure includes a communication portion, a control portion, a certified reference time storage portion, and a determination portion. The communication portion receives a total maintenance time stored in a communication terminal unit from the communication terminal unit. The control portion switches the electronic apparatus between a maintenance mode that accepts a change in the operation setting on the electronic apparatus by an operator and a normal operation mode that allows the electronic apparatus to be activated in a normal way to activate the electronic apparatus. The certified reference time storage portion stores a certified reference time that permits switching to the maintenance mode. The determining portion determines whether the total maintenance time received from the communication terminal unit by the communication portion has reached the certified reference time stored in the certified reference time storage portion. If it is determined that the total maintenance time has reached the certified reference time by the determining portion, the control portion switches the electronic apparatus to the maintenance mode to activate the electronic apparatus.

The non-temporary recording medium of the present disclosure is a non-temporary recording medium readable by a computer that records an operation control program that makes the computer incorporated in an electronic apparatus function. The electronic apparatus includes a communication portion, a control portion, a certified reference time storage portion and a determining portion. The communication portion receives a total maintenance time stored in the communication terminal unit from the communication terminal unit. The control portion switches the electronic apparatus between a maintenance mode that accepts a change in the operation setting on the electronic apparatus by an operator and a normal operation mode that allows the electronic apparatus to be activated in a normal way to activate the electronic apparatus. The certified reference time storage portion stores a certified reference time that permits switching to the maintenance mode. The determining portion determines whether the total maintenance time received from the communication terminal unit by the communication portion has reached the certified reference time stored in the certified reference time storage portion. If it is determined that the total maintenance time has reached the certified reference time by the determining portion, the control portion switches the electronic apparatus to the maintenance mode and activates the electronic apparatus.

The operation control system of the present disclosure is an operation control system including an electronic apparatus and communication terminal units both communicable with each other. The electronic apparatus includes a communication portion, a control portion, a certified reference time storage portion and a determining portion. The communication portion receives a total maintenance time stored in the communication terminal unit from the communication terminal unit. The control portion switches the electronic apparatus between a maintenance mode that accepts a change in the operation setting on the electronic apparatus by an operator and a normal operation mode that allows the electronic apparatus to be activated in a normal way to activate the electronic apparatus. The certified reference time storage portion stores a certified reference time that permits switching to the maintenance mode. The determining portion determines whether the total maintenance time received from the communication terminal unit by the communication portion has reached the certified reference time stored in the certified reference time storage portion. If it is determined that the total maintenance time has reached the certified reference time by the determining portion, the control portion switches the electronic apparatus to the maintenance mode to activate the electronic apparatus. The communication terminal unit includes the total time storage portion for storing the total maintenance time and a data transmission portion for transmitting the total maintenance time stored in the total time storage portion to the electronic apparatus.

DETAILED DESCRIPTION

Hereinafter, an electronic apparatus, a non-temporary storage medium for recording an operation control program, a communication terminal unit, and an operation control system, according to an embodiment of the present disclosure will be described with reference to accompanying drawings. A case where the electronic apparatus of the present disclosure is an image forming apparatus will be described below.

Figure 1:
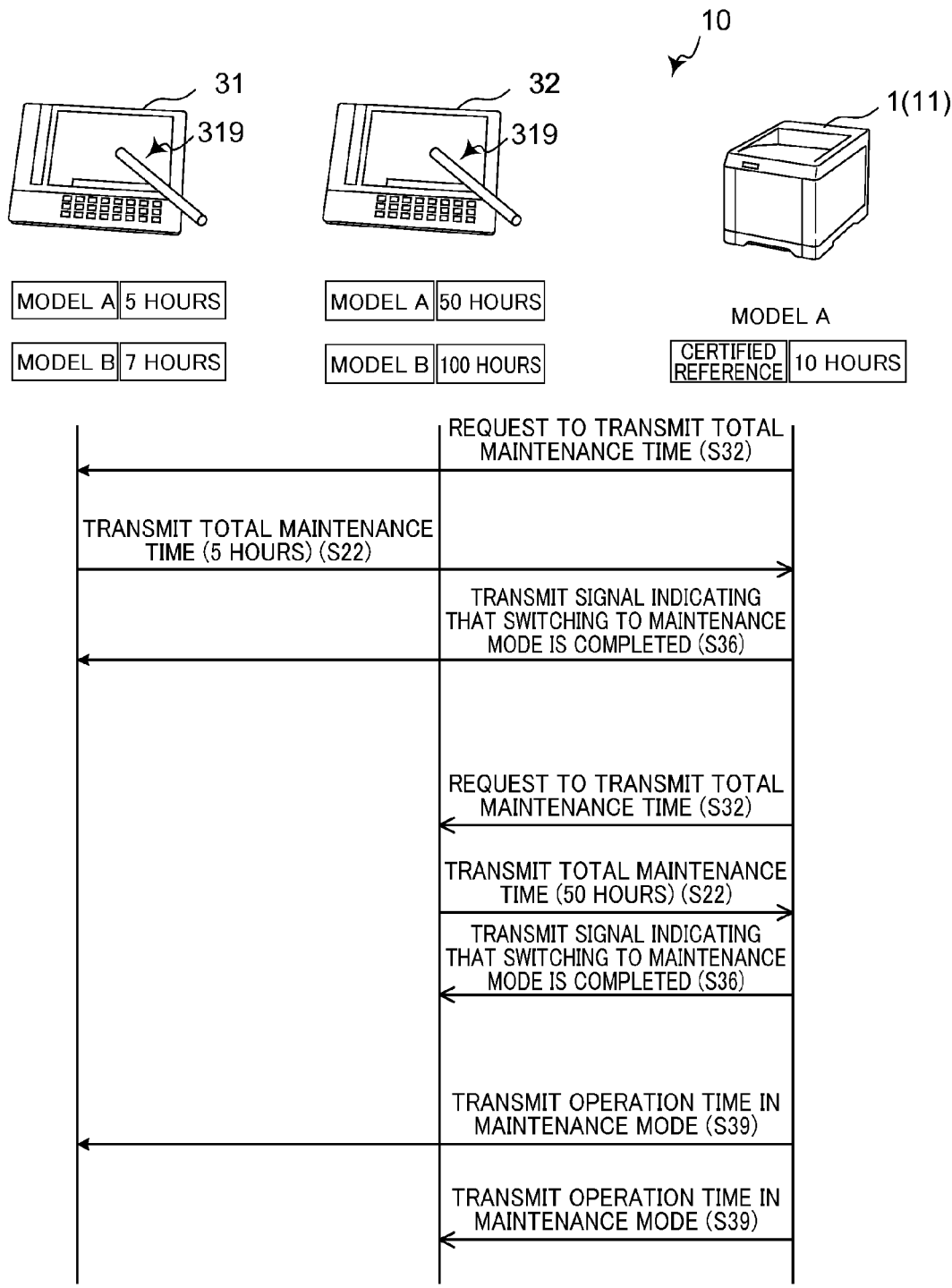
FIG. 1 is a diagram illustrating a communication procedure between an image forming apparatus and a communication terminal unit, both constituting an operation control system.

FIG. 1 is a diagram illustrating a communication procedure between the image forming apparatus and the communication terminal unit, both constituting the operation control system.

The operation control system 10 includes an image forming apparatus and a communication terminal unit, both of which are capable of communicating with each other.

The operation control system 10 includes multifunction peripherals 1, 11, which are an embodiment of the image forming apparatus. The multifunction peripherals 1, 11 have functions as copying machine, facsimile, printer, and scanner. The multifunction peripherals 1, 11 perform copy action and print out data received from a computer connected via a network.

The operation control system 10 includes communication terminal units 31, 32, which are an embodiment of the communication terminal unit of the present disclosure. The communication terminal units 31, 32 are communication devices used for maintenance operation capable of exchanging data with the multifunction peripherals 1, 11. The communication terminal units 31, 32 receive an instruction for setting an operation of the multifunction peripheral 1, which has been input via an input portion 319 by an operator and transmit the setting instruction to the multifunction peripherals 1, 11 to change each setting value of the multifunction peripheral 1, 11. As a communication terminal unit of the present disclosure, it is permissible to use another communication device such as a portable phone or a smart phone.

Although the present embodiment indicates an example in which the operation control system 10 have two multifunction peripherals and two communication terminal units, the number of the communication terminal units and the image forming apparatuses which the operation control system 10 includes is not restricted to any particular one. For example, the operation control system 10 may be an operation control system which includes a single communication terminal unit and a single image forming apparatus.

As a communication method between the multifunction peripheral and the communication terminal unit, the present embodiment adopts such a communication method such as Bluetooth (registered trademark). However, any other communication method may be adopted as long as it can allow communication between the multifunction peripheral 1, 11 and the communication terminal unit 31, 32. A detail of a content of communication between the multifunction peripheral 1, 11 and the communication terminal unit 31, 32 will be described later.

Figure 2:
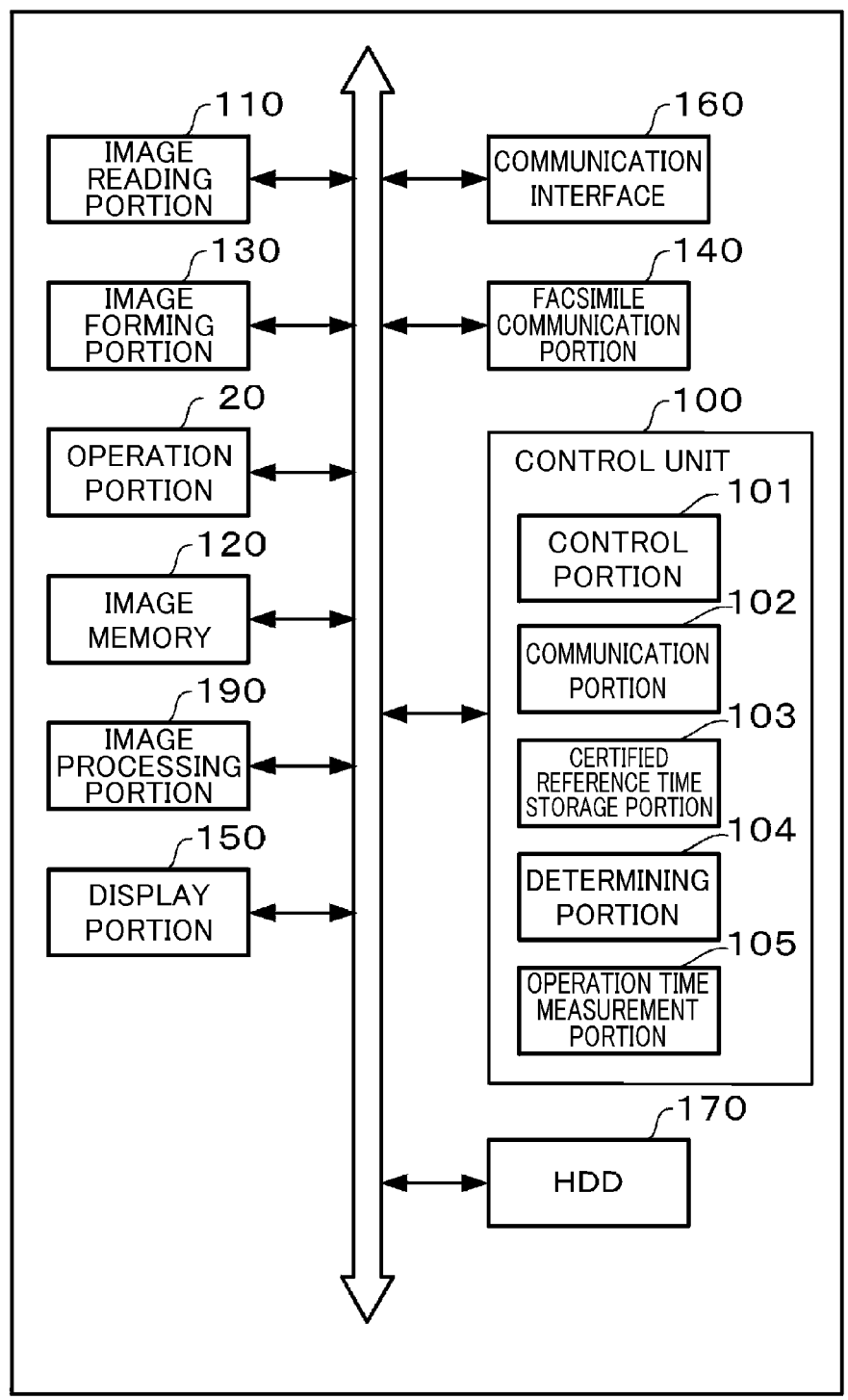
FIG. 2 is a block diagram schematically illustrating an internal configuration of a multifunction peripheral.

Next, an internal configuration of the multifunction peripheral 1, 11 will be described. FIG. 2 is a block diagram schematically illustrating an internal configuration of the multifunction peripheral 1. Because the internal configurations of the multifunction peripherals 1, 11 are identical, the internal configuration of the multifunction peripheral 1 will be explained below.

The multifunction peripheral 1 has a control unit 100, an image reading portion 110, an image memory 120 and an image forming portion 130.

The control unit 100 includes CPU, ROM and RAM or the like and controls an entirety of an operation of the multifunction peripheral 1. The control unit 100 includes a control portion 101, a communication portion 102, a certified reference time storage portion 103, a determining portion 104, and an operation time measurement portion 105. Additionally, an operation control program for the multifunction peripheral 1 is stored in an HDD 170 or a ROM (not illustrated). The control unit 100 is activated according to the operation control program, functioning as the control portion 101, the communication portion 102, the certified reference time storage portion 103, the determining portion 104, and the operation time measuring portion 105. However, the control portion 101, the communication portion 102, the certified reference time storage portion 103, the determining portion 104, and the operation time measuring portion 105 may be formed of each hardware circuit, instead of being activated according to the operation control program. The same thing can be applied to other embodiments unless mentioned otherwise.

The control portion 101 controls an entirety of an operation of the multifunction peripheral 1. The control portion 101 switches over between a maintenance mode and a normal operation mode to activate the multifunction peripheral. The maintenance mode is an operation mode which allows an operator such as personnel in charge of maintenance to execute voltage adjustment relating to development, charging, exposure and image transfer, and display adjustment of a display portion 150. The maintenance mode is also a mode which allows the multifunction peripheral 1 to accept an instruction for changing a value of each setting item about the operation of the multifunction peripheral 1 and performs an operation for changing the value of each setting item to a value indicated by the accepted instruction. The normal operation mode is a mode which allows the multifunction peripheral 1 to perform standard image forming action or image reading action including copy action, facsimile action, printer action, and scanner action.

The communication portion 102 makes a control for receiving total maintenance time stored in the total time storage portion 302 (FIG. 3) in the communication terminal units 31, 32 from the terminal units 31, 32. In the present embodiment, the communication portion 102 executes wireless communication such as the above-mentioned Bluetooth with the communication terminal units 31, 32 via the communication interface 160. The communication portion 102 and the communication interface 160 of the present embodiment are examples of the communication portion.

The certified reference time storage portion 103 is configured of a memory or the like and stores values of the certified reference time for use in determining whether switching to the maintenance mode is permitted. On a manufacturing stage of the multifunction peripheral 1 prior to shipment from plant, the value of the certified reference time specified for each model of the multifunction peripheral is stored in the certified reference time storage portion 103 by a manufacturer. That is, if the multifunction peripheral 1 and the multifunction peripheral 11 are of different models, a different setting reference time is preliminarily specified for each of the multifunction peripheral 1 and the multifunction peripheral 11. The certified reference time storage portions 103 of the multifunction peripheral 1 and the multifunction peripheral 11 store the setting reference time of each model.

This certified reference time is a value for use in determining whether the communication terminal units 31, 32 and operators thereof are permitted to activate the multifunction peripheral 1 in the maintenance mode by comparing with a total maintenance time (described in detail below) received from the communication terminal units 31, 32. In the meantime, the certified reference time storage portion 103 may be substituted by a part of a storage area of the HDD 170 or may be substituted by a part of the area in the image memory 120.

The determining portion 104 determines whether a total maintenance time received from the communication terminal units 31, 32 by the communication unit 102 has reached a certified reference time stored in the certified reference time storage portion 103. When the determining portion 104 determines that the total maintenance time has reached the certified reference time, the control portion 101 switches the multifunction peripheral 1 to the maintenance mode to activate it.

The operation time measurement portion 105 includes a timer. When it is determined that the total maintenance time has reached the certified reference time by the determining portion 104 and the control portion 101 switches the multifunction peripheral 1 to the maintenance mode, the operation time measurement portion 105 measures an operation time during which the multifunction peripheral 1 is operated in the maintenance mode. For a communication terminal unit which has transmitted a total maintenance time to the multifunction peripheral 1 and whose total maintenance time is determined to have reached a certified reference time, the communication portion 102 transmits an operation time measured by the operation time measurement portion 105 (i.e., an operation time in which an operation in the maintenance mode is executed following this determination result).

The image reading portion 110 is configured of a scanner for reading an image on an original.

The image memory 120 is an area for temporarily storing data to be printed by the image forming portion 130 such as data of the original read by the image reading portion 110.

The image forming portion 130 forms an image based on data of the original read by the image reading portion 110 or data transmitted from a personal computer or the like connected via a network.

The multifunction peripheral 1 includes a facsimile communication portion 140, an operation portion 20 and a display portion 150. The facsimile communication portion 140 executes a plurality of functions necessary for facsimile communication and receives image data from an external facsimile unit via a public telephone line. The operation portion 20 is configured of the start key, numeric keypad, and abbreviated number keys for image formation or transmission, and accepts an entry of a variety of instructions by an operator. The display portion 150 is configured of a liquid crystal display (LCD) which displays an operation guide for the operator. In the meantime, the display portion 150 may be equipped with touch-panel function and accept a variety of operation instructions by an operator as an operation portion 20.

Furthermore, the multifunction peripheral 1 includes a hard disk drive (HDD) 170 having a large-capacity storage area for storing original image data read by the image reading portion 110.

The multifunction peripheral 1 further includes an image processing portion 190 and a communication interface 160. The image processing portion 190 executes editing/processing treatment (encoding/decoding, enlargement/reduction, compression/decompression) on image data read by the image reading portion 110. The communication interface 160 exchanges a variety of data including the total maintenance time with the communication terminal units 31, 32. As described above, the communication interface 160 has a function meeting a communication method based on Bluetooth (registered trademark).

Figure 3:
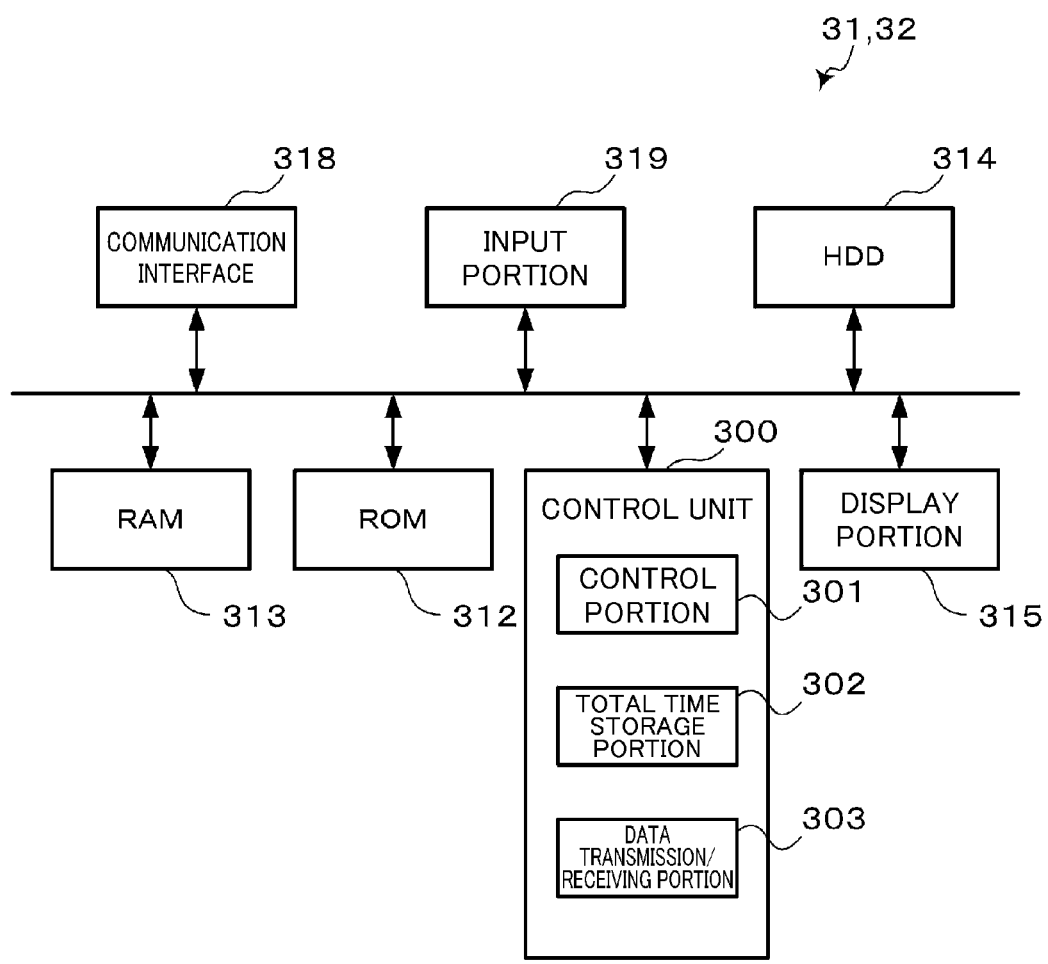
FIG. 3 is a block diagram schematically illustrating an internal configuration of the communication terminal unit.

FIG. 3 is a block diagram schematically illustrating an internal configuration of the communication terminal units 31, 32. Because a configuration required for the present disclosure is identical between the communication terminal units 31 and 32, the communication terminal unit 31 will be explained below.

The communication terminal unit 31 includes a control unit 300, a ROM 312, a RAM 313, a HDD 314, a display portion 315, a communication interface 318, and an input portion 319. These respective portions can transmit/receive data or signals between each other via a CPU bus.

The control unit 300 is configured of a CPU and controls an entirety of operations of the communication terminal unit 31. The ROM 312 stores an operation program about the basic operation of the communication terminal unit 31. The RAM 313 is used as an operation area of the control unit 300.

The HDD 314 stores a variety of data such as document data and image data, which are printing targets, in a part of its storage area. The HDD 314 stores a communication control program. The control unit 300 is activated following execution of the communication control program so that it functions as a control portion 301, a total time storage portion 302, and a data transmission/receiving portion 303 (described in detail below). However, the control portion 301, the total time storage portion 302, and the data transmission/receiving portion 303 in the control unit 300 may be configured of a hardware circuit instead of being activated based on each operation control program. Hereinafter, the same thing can be said of the respective embodiments unless mentioned otherwise.

The display portion 315 is configured of a liquid crystal display (LCD) and displays a variety of data and an operation guide for the operator of the communication terminal unit 31. The communication interface 318 functions as an interface for executing data communication with the multifunction peripherals 1, 11. The communication interface 318 has a function meeting a communication method based on Bluetooth.

The input portion 319 is configured of a keyboard, a touch panel provided on the display portion 315 and a stick pointer or the like. For example, to execute voltage adjustment for development, charging, exposure and image transfer in the image forming portion 130 of the multifunction peripherals 1, 11 or display adjustment of the display portion 150, the input portion 319 accepts an input of instructions for changing a value of each setting item about the operation of the multifunction peripheral 1, 11.

The control unit 300 includes the control portion 301, the total time storage portion 302, and the data transmission/receiving portion 303.

The control portion 301 controls an entirety of the operation of the PC 31.

The total time storage portion 302 stores a total maintenance time which is a total time in which the operator of the communication terminal unit 31 is estimated to have performed maintenance work for the multifunction peripheral 1, 11. The time in which the maintenance work is estimated to have been performed is the length of an operation time in which, after a total maintenance time is transmitted to the multifunction peripheral 1, 11 by the given communication terminal unit 31, the operation in the maintenance mode is permitted by determination by the determining portion 104 of the multifunction peripheral 1, 11 with reference to the total maintenance time and consequently the multifunction peripherals 1, 11 is activated in the maintenance mode. Furthermore, the total maintenance time in which the maintenance work is estimated to have been performed is a total time of respective operation times of the multifunction peripheral 1, 11 which are activated in the maintenance mode as a result of the above-described determination. The data transmission/receiving portion 303 receives the operation time from the multifunction peripheral 1, 11 and the total time storage portion 302 stores or adds the operation time.

The data transmission/receiving portion (data transmission portion, data receiving portion) 303 makes a control for transmitting total maintenance time stored in the total time storage portion 302 to the multifunction peripheral 1, 11. The data transmission/receiving portion 303 receives operation times of the multifunction peripherals 1, 11 activated in the maintenance mode, in which the multifunction peripherals 1, 11 have been activated in the maintenance mode as a result of the determination using the total maintenance time transmitted to the multifunction peripherals 1, 11. The data transmission/receiving portion 303 performs the transmission/receiving via the communication interface 318. The data transmission/receiving portion 303 and the communication interface 318 are examples of the communication portion.

Figure 4:
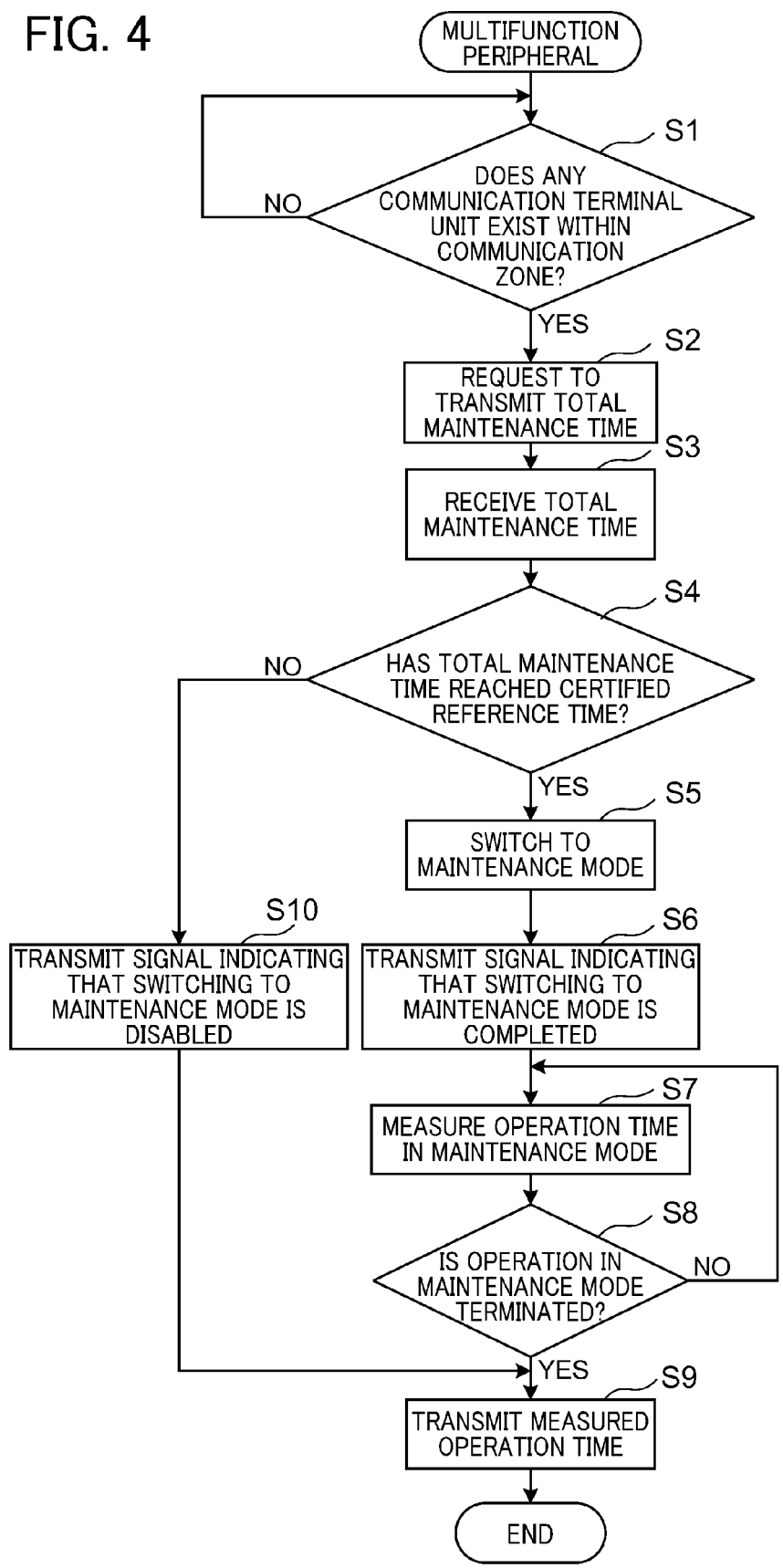
FIG. 4 is a flow chart illustrating a first embodiment of processing upon maintenance mode selection control in the multifunction peripheral.
Figure 5:
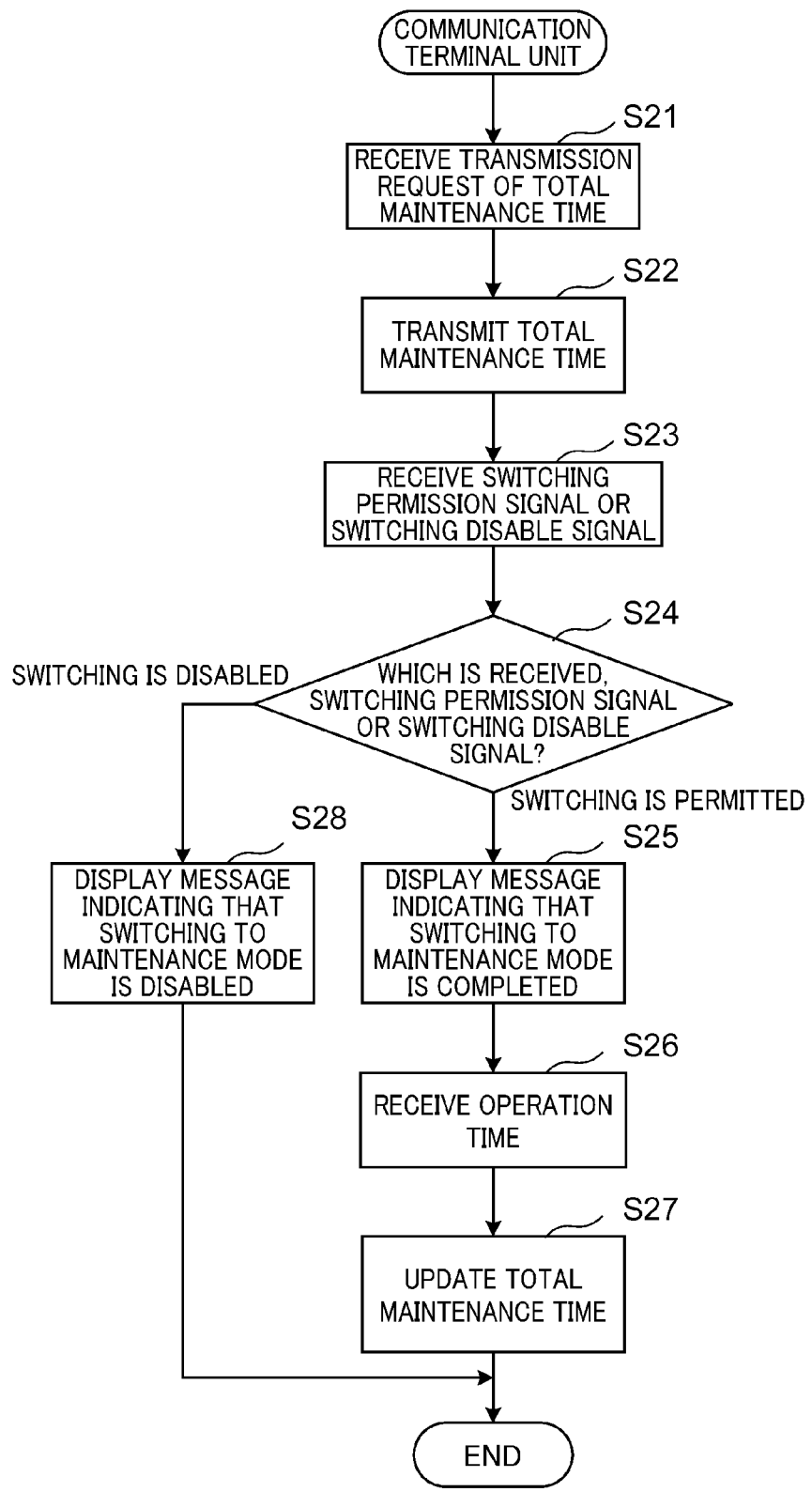
FIG. 5 is a flow chart illustrating a processing upon maintenance mode selection control in the communication terminal unit.
Figure 6:
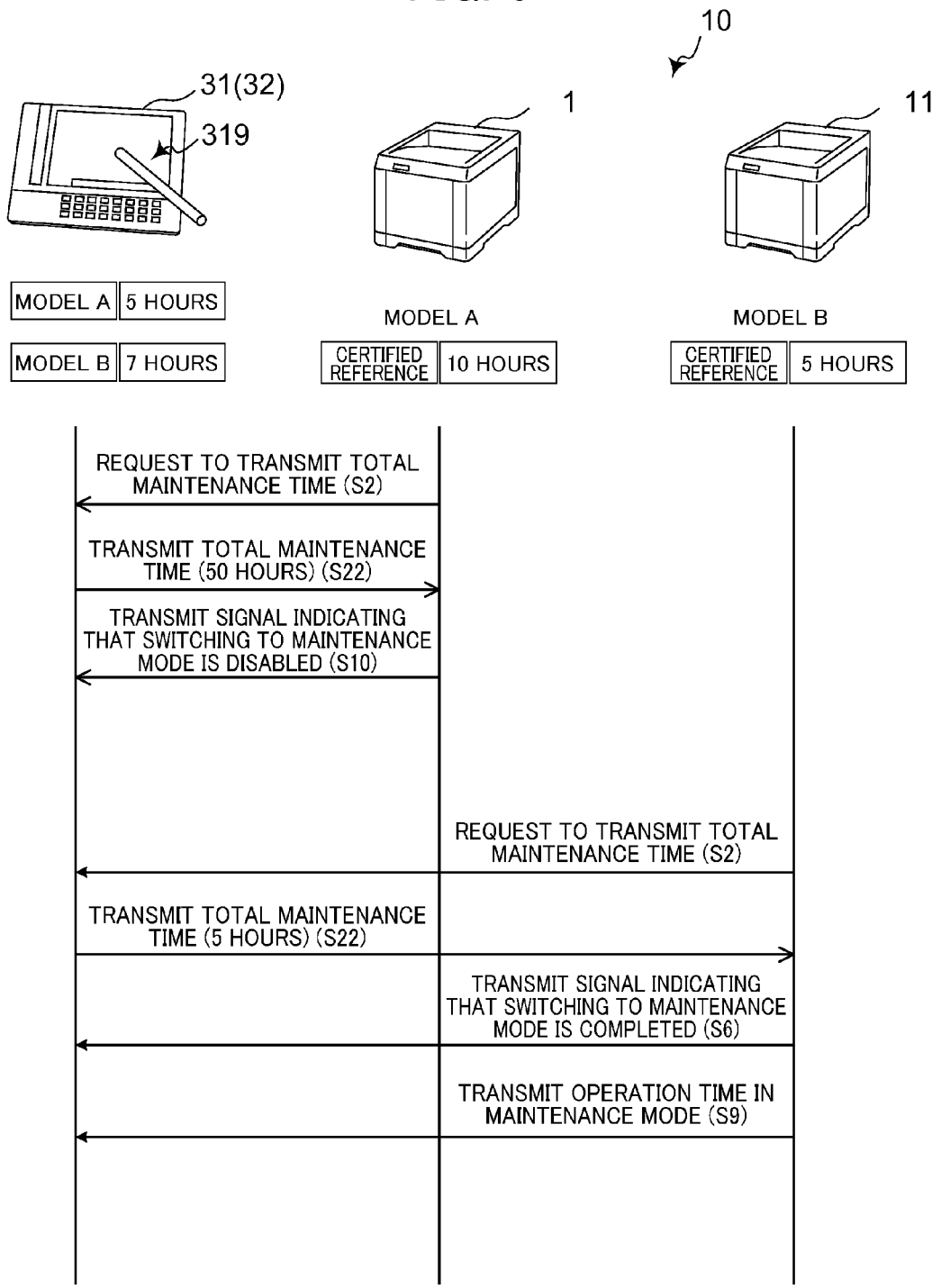
FIG. 6 is a diagram illustrating a communication procedure between the image forming apparatus and the communication terminal unit, both constituting the operation control system.
Figure 7:
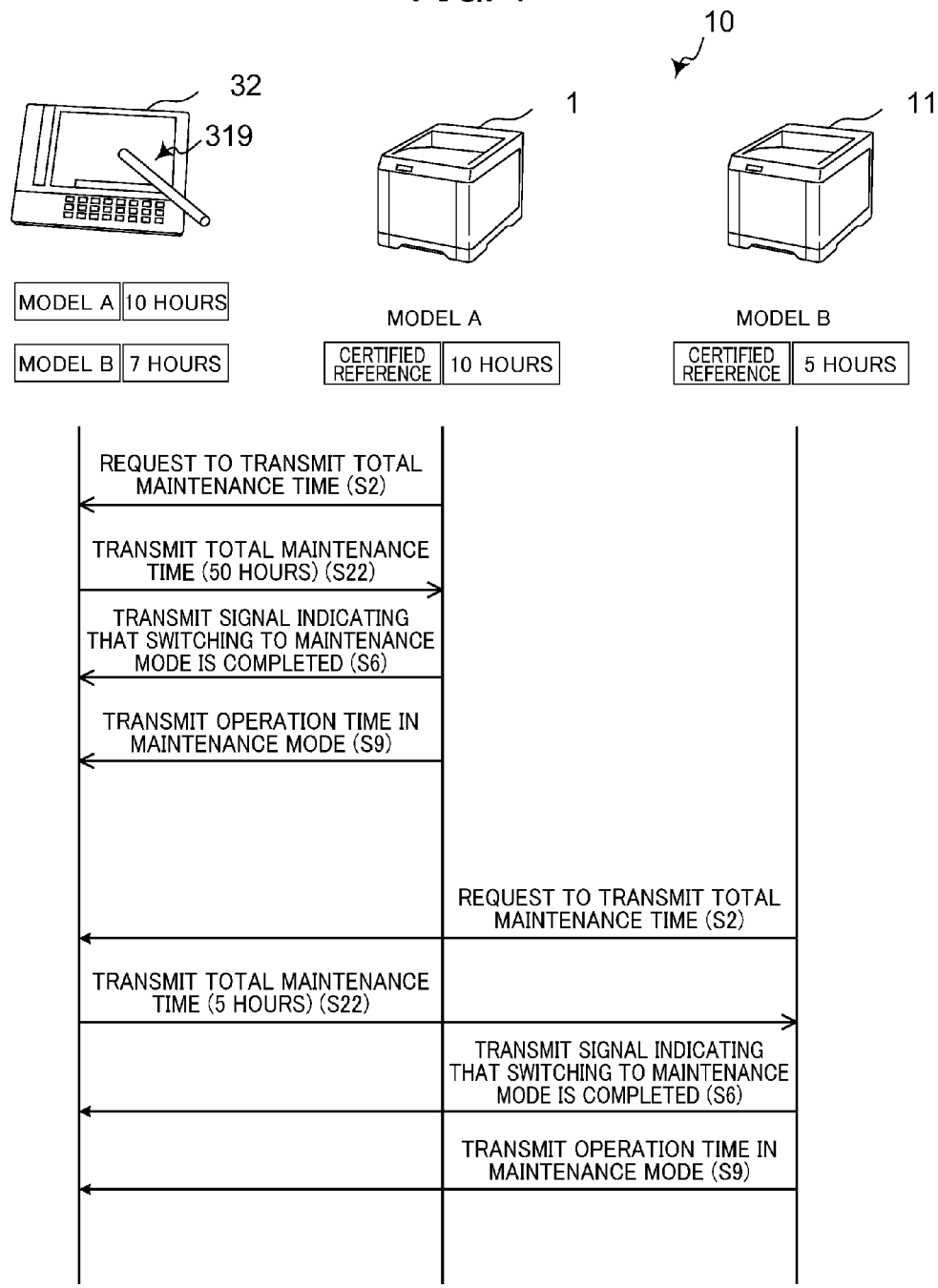
FIG. 7 is a diagram illustrating a communication procedure between the image forming apparatus and the communication terminal unit, both constituting the operation control system.

Next, a first embodiment of processing upon maintenance mode selection control between the multifunction peripherals 1, 11 and the communication terminal units 31, 32 constituting the operation control system 10 will be described below. FIG. 4 is a flowchart illustrating the first embodiment of the processing upon maintenance mode selection control by the multifunction peripherals 1, 11. FIG. 5 is a flow chart illustrating a processing upon maintenance mode selection control by the communication terminal units 31, 32. FIGS. 6 and 7 are a diagram illustrating a communication procedure between the multifunction peripheral and the communication terminal unit constituting the operation control system 10. Because the multifunction peripherals 1, 11 perform an identical processing, the multifunction peripheral 1 will be explained unless especially mentioned.

In the multifunction peripheral 1, the communication portion 102 determines whether any communication terminal unit capable of data communication through Bluetooth communication via the communication interface 160 exists within a communication zone which allows communication by the communication portion 102 and the communication interface 160. The communication zone is specified preliminarily in a range where a personnel in charge of maintenance work of the multifunction peripheral 1 is estimated to exist, for example, a range 3 m in radius around the multifunction peripheral 1. Determining whether the personnel in charge of maintenance exists in a communication zone which allows communication by the communication portion 102 is performed based on a communication using a known method for searching for a communicable mate based on the Bluetooth system.

If it is determined that any communication terminal unit capable of data communication exists within the communication zone by the communication portion 102 (YES in S1), the communication portion 102 transmits an instruction of requesting for transmission of a total maintenance time stored in the total time storage portion 302 to the given communication terminal unit (S2). Hereinafter, a following description will be made assuming that the communication terminal unit capable of data communication is the communication terminal unit 31 unless mentioned otherwise.

On the other hand, if the data transmission/receiving portion 303 in the communication terminal unit 31 receives a request for transmission of the total maintenance time from the multifunction peripheral 1 (S1), the data transmission/receiving portion 303 reads a total maintenance time stored in the total time storage portion 302 and transmits the read total maintenance time to the multifunction peripheral 1 (S22).

In the multifunction peripheral 1, if the communication portion 102 receives the above-mentioned total maintenance time from the data transmission/receiving portion 303 of the communication terminal unit 31 as a return signal corresponding to a transmission request of the total maintenance time transmitted in S2 (S3), the determining portion 104 determines whether the received total maintenance time has reached a certified reference time stored in the certified reference time storage time 103 (S4).

If the determining portion 104 determines that the total maintenance time has reached the certified reference time (YES in S4), the control portion 101 switches the operation mode of the multifunction peripheral 1 to maintenance mode to activate the multifunction peripheral 1 in the maintenance mode (S5). At this time, the communication portion 102 transmits a signal indicating that the operation mode of the multifunction peripheral 1 has been switched to the maintenance mode to the communication terminal unit 31 (S6).

In S4, if the determining portion 104 determines that the total maintenance time has not reached the certified reference time (NO in S4), the communication portion 102 transmits a signal indicating that the operation mode of the multifunction peripheral 1 cannot be switched to the maintenance mode to the communication terminal unit 31 (S10).

For example, as shown in FIG. 6, if the multifunction peripheral 1 of model A stores 10 hours as a setting reference time in the certified reference time storage portion 103, and a value stored as a total maintenance time of model A in the total maintenance time storage portion 302 of the communication terminal unit 31 is 5 hours, the determining portion 104 determines that the above-mentioned total maintenance time of the communication terminal unit 31 has not reached the above-mentioned certified reference time.

However, in this example, if the multifunction peripheral 11 of model B stores 5 hours as a setting reference time in the certified reference time storage portion 103 and a value stored as a total maintenance time for model B in the total maintenance time storage portion 302 of the communication terminal unit 31 is 7 hours, the determining portion 104 of the multifunction peripheral 11 determines that the total maintenance time of the communication terminal unit 31 has reached the certified reference time. Communication with the multifunction peripheral 1 of model B is as shown in FIG. 6.

As shown in FIG. 7, if a total maintenance time of 10 hours of model A and a total maintenance time of 7 hours of model B are stored in the total maintenance time storage portion 302 of the communication terminal unit 32, the determining portions 104 of the multifunction peripheral 1 of model A and the determining portion 104 of the multifunction peripheral 11 of model B determine that both the above-mentioned total maintenance times of the communication terminal units 32 have reached the above-mentioned certified reference time.

In the communication terminal unit 31, if the data transmission/receiving portion 303 receives a signal in S6 or S10 (S23), the control portion 301 determines whether the received signal is a switching permission signal indicating that the operation mode of the multifunction peripheral 1 has been switched to the maintenance mode or a switching disable signal indicating that the operation mode of the multifunction peripheral 1 cannot be switched to the maintenance mode (S24).

If the control portion 301 determines that the received signal is a switching permission signal indicating that the operation mode of the multifunction peripheral 1 has been switched to the maintenance mode (switching is permitted in S24), the control portion 301 displays a message indicating that the multifunction peripheral 1 has been switched to the maintenance mode on the display portion 315 (S25).

If the control portion 301 determines that the received signal is a switching disable signal indicating that the operation mode of the multifunction peripheral 1 cannot be switched to the maintenance mode (switching is disabled in S24), the control portion 301 displays a message indicating that the multifunction peripheral 1 cannot be activated in the maintenance mode on the display portion 315 (S28).

If the multifunction peripheral 1 is switched its operation mode to the maintenance mode and is activated in the maintenance mode, the operation time measurement portion 105 starts measurement of an operation time since the operation in the maintenance mode is started (S7). The measurement of the operation time of the operation time measurement portion 105 is continued until the operation in the maintenance mode is terminated (NO in S8). In the multifunction peripheral 1, an instruction transmitted from the communication terminal unit 31 is received by the communication portion 102 and the communication interface 160. For example, to perform voltage adjustment for development, charging, exposure and image transfer of the image forming portion 130 and display adjustment of the display portion 150 according to the instruction, the control portion 101 accepts an instruction for changing the value of each setting item about the operation of the multifunction peripheral 1 and changes the value of each setting item to a value of each setting item indicated by the accepted instruction.

After the operation in the maintenance mode is started, until the communication portion 102 and the communication interface 160 receive an instruction for terminating a procedure in the maintenance mode transmitted from the communication terminal unit 31, the control portion 101 continues the operation of the multifunction peripheral 1 in the maintenance mode and then, the operation time measurement portion 105 measures the above-mentioned operation time. If the communication portion 102 and the communication interface 160 receives the instruction for terminating the procedure in the maintenance mode, the control portion 101 terminates the operation of the multifunction peripheral 1 in the maintenance mode according to the above instruction, and the operation time measurement portion 105 terminates measurement of the above-mentioned operation time (YES in S8).

After the operation of the multifunction peripheral 1 in the maintenance mode is terminated, the communication portion 102 transmits an operation time measured by the operation time measurement portion 105 to the communication terminal unit 31, which is a communication terminal unit regarded as a communication target in S2 and S3.

If the data transmission/receiving portion 303 in the communication terminal unit 31 receives an operation time measured by the operation time measurement portion 105 (S26), the total time storage portion 302 updates a total maintenance time stored up to then to a value plus the received operation time (S27).

According to the first embodiment, the multifunction peripherals 1, 11 use the total maintenance time received from the communication terminal units 31, 32 to determine whether operation in the maintenance mode is permitted and switches itself to the maintenance mode based on a result of comparison between the total maintenance time and a certified reference time stored in the certified reference time storage portion. Thus, the multifunction peripherals 1, 11 do not need to store operator identification information such as ID and name of an operator permitted to activate the multifunction peripherals 1, 11 in the maintenance mode to determine whether the operation in the maintenance mode is permitted. Furthermore, no server is needed to determine whether the operation in the maintenance mode is permitted, unlike user authentication. The multifunction peripherals 1, 11 need only to store the certified reference time and makes the above-described determination using total maintenance time received from the communication terminal units 31, 32 without using such information as ID and name which the operator must memorize. As a result, a situation in which information for use in the above determination may leak to other person so that the situation in which the operation setting may be switched to the maintenance mode by the other person can be prevented thereby improving the security with respect to conventionally.

According to the first embodiment, the communication portion 102 of the multifunction peripherals 1, 11 requests a communication terminal unit which has entered the communication zone to transmit a total maintenance time and obtains a total maintenance time from the communication terminal unit. Thus, only a communication terminal unit and its operator existing in the vicinity of the multifunction peripheral 1, 11 may be regarded as a target to be applied in determining whether the operation in the maintenance mode is permitted.

According to the first embodiment, the communication portion 102 of the multifunction peripherals 1, 11 transmits the above-mentioned operation time measured by the operation time measurement portion 105 to a communication terminal unit which has transmitted a total maintenance time determined to have reached the certified reference time. Thus, the communication terminal unit can add its operation time to the total maintenance time stored in the total time storage portion 302 to update it.

That is, the total maintenance time can be increased successively depending on an increase in maintenance work time of the multifunction peripheral 1, 11 by an operator of the communication terminal unit 31, 32. In this case, if the communication terminal units 31, 32 transmit a total maintenance time to the multifunction peripherals 1, 11 corresponding to a request from the multifunction peripherals 1, 11, the determining portion 104 of the multifunction peripherals 1, 11 makes the above determination based on a total maintenance time updated depending on the length of experience time on maintenance work by the operator of the communication terminal units 31, 32.

Thus, if the data transmission/receiving portion 303 of the communication terminal units 31, 32 transmits the total maintenance time increasing successively to the multifunction peripherals 1, 11, the multifunction peripherals 1, 11 can determine whether the operation of the multifunction peripherals 1, 11 in the maintenance mode is permitted corresponding to the length of the maintenance time to the multifunction peripherals 1, 11 by the operator.

Figure 8:
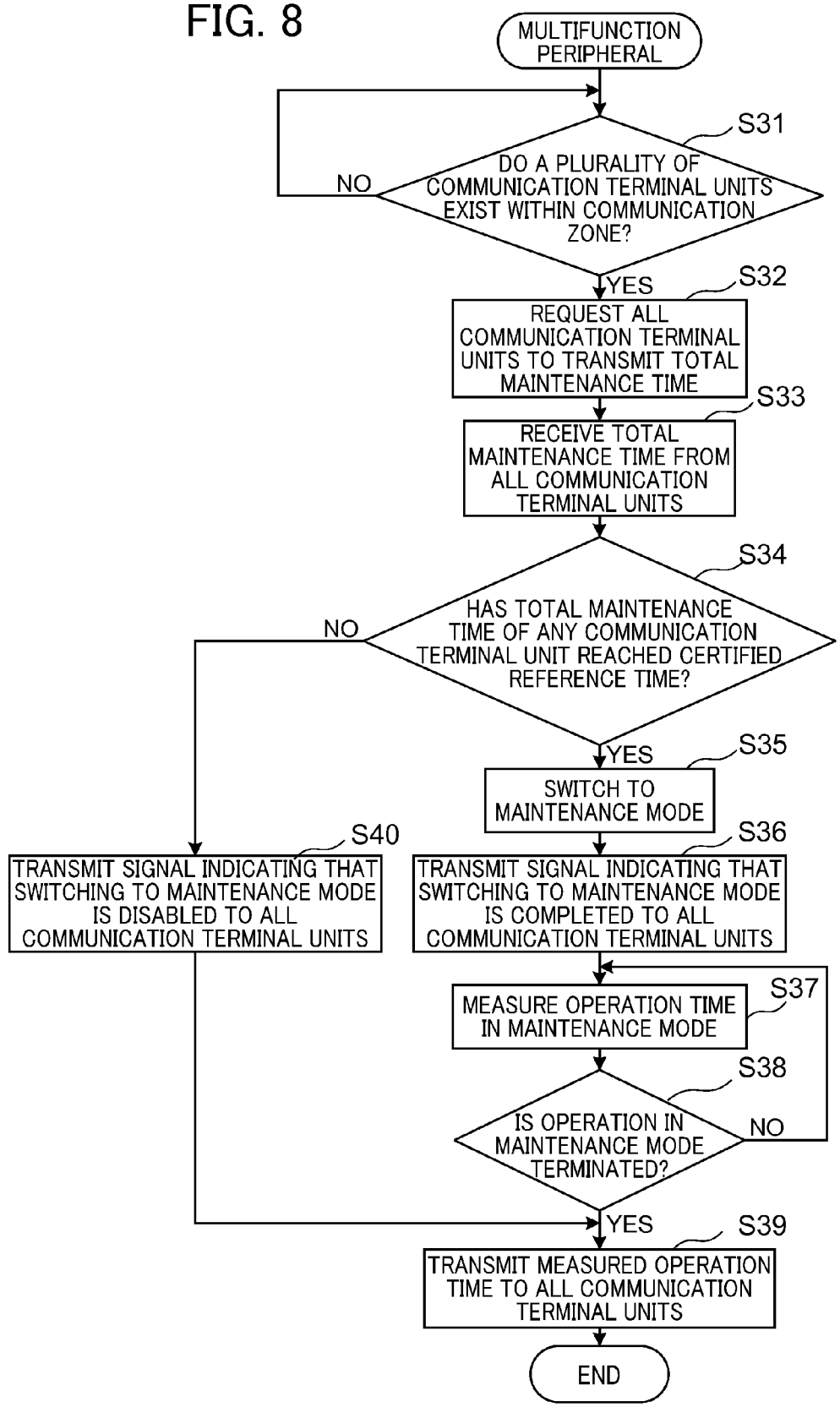
FIG. 8 is a flow chart illustrating a second embodiment of processing upon maintenance mode selection control in the multifunction peripheral.

Next, a second embodiment of a processing upon maintenance mode selection control with the multifunction peripheral 1 and the communication terminal units 31, 32 both constituting the operation control system 10 will be described below. FIG. 8 is a flow chart illustrating the second embodiment of the processing upon maintenance mode selection control with the multifunction peripheral 1. The second embodiment will be described with reference to FIG. 1 illustrated previously as well as FIG. 8.

Additionally, description about the same processing as the first embodiment is omitted. A processing of the communication terminal unit will be described with reference to FIG. 5 because it is substantially equal to the first embodiment unless mentioned otherwise. The multifunction peripherals 1, 11 will be described as the multifunction peripheral 1 because they perform the same processing unless mentioned otherwise.

According to the second embodiment, the communication portion 102 of the multifunction peripheral 1 determines whether the above-mentioned communication terminal unit exists within the communication zone via the communication interface 160. If the communication portion 102 determines that a plurality of the communication terminal units exist within the communication zone (YES in S31), the communication portion 102 transmits an instruction of requesting for transmitting a total maintenance time stored in the total time storage portion 302 to all the communication terminal units existing within the communication zone (S32). Regarding the present embodiment, a case where the communication portion 102 determines existence of the communication terminal units 31, 32 as the plurality of the communication terminals will be described below. Additionally, if the communication portion 102 determines existence of a single communication terminal unit, the same processing as the first embodiment is performed, and description thereof is omitted.

On the other hand, if the data transmission/receiving portion 303 in each of the communication terminal units 31, 32 receives a request for transmitting the total maintenance time from the multifunction peripheral 1 (S21), the data transmission/receiving portion 303 reads a total maintenance time stored in the total time storage portion 302 and transmits the read total maintenance time to the multifunction peripheral 1 (S22).

If, in the multifunction peripheral 1, the communication portion 102 receives the total maintenance time from the data transmission/receiving portion 303 corresponding to the request for transmitting the total maintenance time to each of the communication terminal units 31, 32 (S33) has transmitted in S32, the determining portion 104 determines whether each of the received total maintenance times has reached a certified reference time stored in the certified reference time storage portion 103 (S34).

If the determining portion 104 determines that any one of the above received total maintenance times has reached the certified reference time (YES in S34), the control portion 101 switches the operation mode of the multifunction peripheral 1 to a maintenance mode to activate the multifunction peripheral 1 in the maintenance mode (S35). The communication portion 102 transmits a signal indicating that the operation mode of the multifunction peripheral 1 has been switched to the maintenance mode to both the communication terminal units 31, 32 (i.e., all the communication terminal units existing within the communication zone in S31)(S36). The operation time measurement portion 105 measures an operation time in the maintenance mode since the operation in the maintenance mode is started (S37).

In S34, if the determining portion 104 determines that any one of the received total maintenance times has not reached the certified reference time (NO in S34), the communication portion 102 transmits a signal indicating that switching the operation mode of the multifunction peripheral 1 to the maintenance mode is disabled to both the communication terminal units 31, 32 (i.e., all the communication terminal units existing within the communication zone in S32) (S40).

In the communication terminal units 31, 32, the control portion 301 controls display of the display portion 315 corresponding to the content of a signal in S35 or S40 received by the data transmission/receiving portion 303 from the multifunction peripheral 1.

For example, as shown in FIG. 1, if the multifunction peripheral 1 of model A stores 10 hours as its setting reference time in the certified reference time storage portion 103, a value of the total maintenance time of model A stored in the total time storage portion 302 of the communication terminal unit 31 is 5 hours, and further a value of the total maintenance time of model A stored in the total time storage portion 302 of the communication terminal unit 32 is 50 hours, the determining portion 104 of the multifunction peripheral 1 determines that the total maintenance time of the communication terminal unit 31 has not reached the above certified reference time and on the other hand, that the total maintenance time of the communication terminal unit 32 has reached the certified reference time.

In the multifunction peripheral 1, the communication portion 102 and the communication interface 160 receive instructions transmitted from both the communication terminal units 31, 32 in a period when the multifunction peripheral 1 is being activated in the maintenance mode by the control unit 101, and the control portion 101, according to both the instructions, changes the value of each setting item about the operation of the multifunction peripheral 1 to a value of the setting item indicated by the instruction.

After the operation in the maintenance mode is started, the control portion 101 continues the operation of the multifunction peripheral 1 in the maintenance mode until the communication portion 102 and the communication interface 160 receive an instruction for terminating the work in the maintenance mode or the like (NO in S38, so that the procedure returns to S37). On the other hand, if the communication portion 102 and the communication interface 160 receive the instruction for terminating the work in the maintenance mode or the like, the control portion 101, according to the instruction, terminates the operation of the multifunction peripheral 1 in the maintenance mode (YES in S38).

After the operation of the multifunction peripheral 1 in the maintenance mode is terminated, the communication portion 102 transmits an operation time measured by the operation time measurement portion 105 to both the communication terminal units 31, 32 (S39).

If the data transmission/receiving portion 303 in each of the communication terminal units 31, 32 receives an operation time measured by the operation time measurement portion 105 from the multifunction peripheral 1 (S26), the total time storage portion 302 updates a total maintenance time stored up to then to a value plus the received operation time (S27).

According to the second embodiment, for example, if an operator (e.g., beginner) having the communication terminal unit 31 which stores a total maintenance time which has not reached the certified reference time and an operator (e.g., instructor) having the communication terminal unit 32 which stores a total maintenance time which has reached the certified reference time exist within the communication zone, even the operator insufficiently skilled in maintenance work (beginner) can activate the multifunction peripherals 1, 11 in the maintenance mode as long as the operator sufficiently skilled in the maintenance work and in charge of instruction (instructor) exists within the communication zone. The operation time in the maintenance mode measured by the operation time measurement portion 105 is transmitted to the communication terminal units 31, 32 which the both operators have from the communication portion 102. Thus, the communication terminal units 31, 32 of the both operators become able to update the stored total maintenance time by adding the received operation time thereto, so that the received operation time can be added to the communication terminal unit 31 of the insufficiently skilled operator (beginner) as well as the communication terminal unit 32 of the operator in charge of instruction (instructor).

Additionally, the present disclosure is not restricted to the configuration of the above-described embodiments but may be modified in a variety of forms. For example, although in each of the above-described embodiments, an example in which the communication terminal units 31, 32 are a communication device dedicated to the maintenance work has been described, the communication terminal unit is not restricted to this example. If a communication device such as a portable phone or a smart phone is used as the communication terminal unit of the present disclosure, the multifunction peripheral 1 accepts an instruction for setting an operation of the multifunction peripheral 1 inputted by the operator while the multifunction peripheral 1 is activated in the maintenance mode, and the control portion 101 changes each setting value related to the operation of the multifunction peripheral 1 according to the instruction.

Although in the above embodiments, a case where an electronic apparatus related to the present disclosure is an image forming apparatus has been described, the electronic apparatus of the present disclosure is not restricted to the image forming apparatus, but the present disclosure can be applied to other electronic apparatus as long as it has the maintenance mode.

Additionally, the configuration and processing illustrated in the respective embodiments using FIG. 1 to FIG. 8 are only an embodiment and it is not intended to restrict the present disclosure to this configuration and processing.

An operation control program for making a computer incorporated in an electronic apparatus to execute its function may be stored in a ROM and a hard disk of the computer and further may be stored (recorded) non-temporarily in a computer-readable recording medium, for example, an external memory device or a portable recording medium.

The external storage device refers to a memory extension device incorporating a storage medium such as a compact disk-read only memory (DC-ROM) and connected to an electronic apparatus. The portable recording medium refers to a recording medium which can be carried and mounted on a recording medium drive unit (drive unit), such as a flexible disk, a memory card, a magneto-optical disk.

A program recorded in the recording medium is loaded onto the RAM or the like of a computer and executed by a central processing unit (CPU). Executing the program achieves functions of the computer.

The invention claimed is:

1. An electronic apparatus comprising:
   a communication portion that receives a total maintenance time stored in a communication terminal unit from the communication terminal unit;
   a control portion that switches the electronic apparatus between a maintenance mode that accepts a change in an operation setting on the electronic apparatus by an operator and a normal operation mode that allows the electronic apparatus to be activated in a normal way to activate the electronic apparatus;
   a certified reference time storage portion that stores a certified reference time that permits switching to the maintenance mode; and
   a determining portion that determines whether the total maintenance time received from the communication terminal unit by the communication portion has reached the certified reference time stored in the certified reference time storage portion,
   wherein if it is determined that the total maintenance time has reached the certified reference time by the determining portion, the control portion switches the electronic apparatus to the maintenance mode to activate the electronic apparatus.

2. The electronic apparatus according to claim 1, wherein the communication portion communicates with the communication terminal unit within a predetermined communication zone, and when it is detected that the communication terminal unit exists within the communication zone, requests the communication terminal unit to transmit a total maintenance time.

3. The electronic apparatus according to claim 1, further comprising an operation time measurement portion that measures an operation time that allows the electronic apparatus to be switched to the maintenance mode and activated based on a determination result by the determining portion,
   wherein the communication portion transmits the operation time measured by the operation time measurement portion to a communication terminal unit that has transmitted the total maintenance time determined to have reached the certified reference time.

4. The electronic apparatus according to claim 2, further comprising an operation time measurement portion that measures an operation time that allows the electronic apparatus to be switched to the maintenance mode and activated based on a determination result by the determining portion,
   wherein the communication portion transmits the operation time measured by the operation time measurement portion to a communication terminal unit that has transmitted the total maintenance time determined to have reached the certified reference time.

5. The electronic apparatus according to claim 3, wherein the communication portion receives the total maintenance time from a plurality of communication terminal units;
   the determining portion determines whether each of the total maintenance times that the communication portion receives from the plurality of communication terminal units has reached the certified reference time;

when it is determined that the total maintenance time of at least any one of the plurality of the communication terminal units has reached the certified reference time by the determining portion, the control portion switches the electronic apparatus to the maintenance mode to activate the electronic apparatus; and the communication portion transmits an operation time measured by the operation time measurement portion to each of the plurality of the communication terminal units.

6. The electronic apparatus according to claim 4, wherein the communication portion receives the total maintenance time from a plurality of communication terminal units;

the determining portion determines whether each of the total maintenance times that the communication portion receives from the plurality of the communication terminal units has reached the certified reference time;

when it is determined that the total maintenance time of at least any one of the plurality of the communication terminal units has reached the certified reference time by the determining portion, the control portion switches the electronic apparatus to the maintenance mode to activate the electronic apparatus; and the communication portion transmits an operation time measured by the operation time measurement portion to each of the plurality of the communication terminal units.

7. A non-temporary recording medium readable by a computer that records an operation control program that makes the computer incorporated in an electronic apparatus function, wherein the electronic apparatus comprises:

a communication portion that receives a total maintenance time stored in a communication terminal unit from the communication terminal unit;

a control portion that switches the electronic apparatus between a maintenance mode that accepts a change in operation setting of the electronic apparatus by an operator and a normal operation mode that allows the electronic apparatus to be activated in a normal way to activate the electronic apparatus;

a certified reference time storage portion that stores a certified reference time that permits switching to the maintenance mode; and a determining portion that determines whether the total maintenance time received from the communication terminal unit by the communication portion has reached the certified reference time stored in the certified reference time storage portion, wherein if it is determined that the total maintenance time has reached the certified reference time by the determining portion, the control portion switches the electronic apparatus to the maintenance mode to activate the electronic apparatus.

8. An operation control system including an electronic apparatus and communication terminal units both communicable with each other, wherein the electronic apparatus comprises:

a communication portion that receives a total maintenance time stored in a communication terminal unit from the communication terminal unit;

a control portion that switches the electronic apparatus between a maintenance mode that accepts a change in the operation setting of the electronic apparatus by an operator and a normal operation mode that allows the electronic apparatus to be activated in a normal way to activate the electronic apparatus;

a certified reference time storage portion that stores a certified reference time that permits switching to the maintenance mode; and a determining portion that determines whether the total maintenance time received from the communication terminal unit by the communication portion has reached the certified reference time stored in the certified reference time storage portion, wherein if it is determined that the total maintenance time has reached the certified reference time by the determining portion, the control portion switches the electronic apparatus to the maintenance mode to activate the electronic apparatus, and wherein the communication terminal unit comprises:

a total time storage portion that stores the total maintenance time; and a data transmission portion that transmits a total maintenance time stored in the total time storage portion to the electronic apparatus.

* * * * *